FLAT PATH EXTRACTOR

Original Filed Oct. 11, 1965 2 Sheets-Sheet 1

INVENTOR
EDWARD H. ROFE

Farley, Forster + Farley
ATTORNEYS

FLAT PATH EXTRACTOR

Original Filed Oct. 11, 1965 2 Sheets-Sheet 2

INVENTOR
EDWARD H. ROFE
Farley, Forster & Farley
ATTORNEYS

United States Patent Office

Re. 27,754
Reissued Sept. 11, 1973

27,754
FLAT PATH EXTRACTOR

Edward H. Rofe, 2781 Acorn Road,
Bloomfield Hills, Mich. 48013

Original No. 3,387,717, dated June 11, 1968, Ser. No. 494,740, Oct. 11, 1965. Application for reissue June 8, 1970, Ser. No. 44,668
Int. Cl. B23q 7/04
U.S. Cl. 214—1 BD 10 Claims

Matter enclosed in heavy brackets [ ] appears in the original patent but forms no part of this reissue specification; matter printed in italics indicates the additions made by reissue.

*ABSTRACT OF THE DISCLOSURE*

*An improved work handling device for presses having a desired flat work handling arm path and simple actuating mechanism including a single acting hydraulic snubber adapted to provide no resistance over the major portion of the upward arm stroke, a cushioning or resistance stop at the end of the upward stroke, no resistance in the initial accelerating portion of the down stroke, and with cushioned controlled descent thru the remaining major portion of the down stroke.*

This invention relates generally to work-handling devices and more particularly to devices for withdrawing stampings from presses.

In removing sheet metal stampings from power presses, it is necessary to lift the stamping slightly before it can be horizontally withdrawn from the press. This initial lifting is necessary to permit the stamping to clear the forming contours of the die. Since a variety of die configurations may be utilized in a given press, it is desirable that associated equipment for mechanically withdrawing a stamping from the press have a variable stroke pattern so that the necessary lift will be available for any depth of draw.

Accordingly, it is an object of this invention to provide a mechanical work-handling device for removing stampings from power presses wherein the motion of the work-handling arm is initially vertical followed by a substantially horizontal path with respect to the die.

It is a further object of this invention to provide a work-handling arm wherein the shape of the stroke described by the work-handling arm may be selectively varied.

Other objects, advantages and novel features of this invention will become apparent from the following specification when considered in conjunction with the accompanying drawings.

Figure 1:
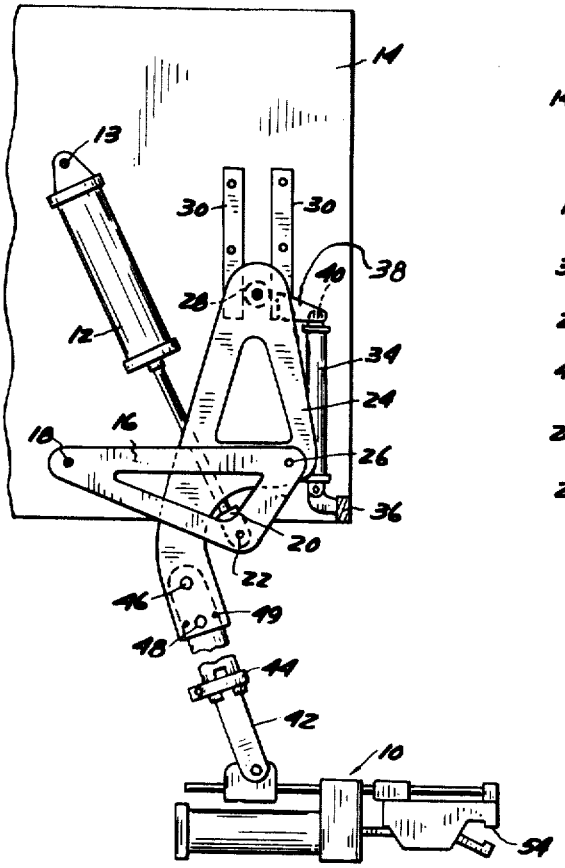
FIG. 1 is a side view of the work-handling device of this invention, with one side of the frame removed to expose the inner mechanism.
Figure 2:
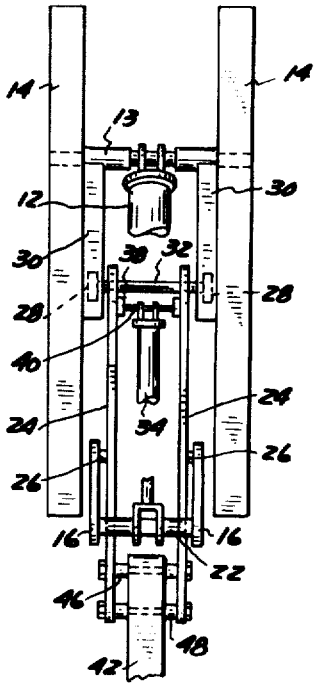
FIG. 2 is a partially fragmented front view of the device illustrated in FIG. 1.

Referring to the drawings, the motion of the work-gripping assembly 10 is controlled through a linkage by means of a pneumatic actuating cylinder 12. Cylinder 12 is pivotally mounted on pin 13 to a pair of members 14. Similarly, a pair of links 16 are pivotally mounted by pins 18 to frame members 14. The motion of the pneumatic cylinder 12 is transmitted to links 16 by means of a clevis and pin connection 20, 22.

Swing plates 24 are pivotally mounted on links 16 by pins 26. Followers 28 located at the upper end of each swing plate 24 each ride in a guide slot formed between two gibs 30 which are secured to each frame member 14. These followers are rotatably mounted on follower shaft 32, supported between the two swing plates. Provision is made for mounting gibs 30 in other parallel but non-vertical (as viewed in FIG. 1) orientations. This could be achieved by means of additional mounting holes or by slots. The function of such other positions will be explained below.

A hydraulic snubber 34 is secured by a bracket 36 to frame 14 at its lower end and at its upper end is rigidly secured to swing plate 24 by means of a bracket 38. The connection between snubber 34 and bracket 38 is through a pin 40, so that rotational motion therebetween may be achieved. Snubber 34 is designed to provide cushioning or resistance only on the inward (downward) stroke of its piston, and to provide substantially no resistance to the outer (upward) stroke.

The lower arm 42 of the device forms an extension of swing plates 24 and may be telescoped with respect thereto through clamp 44. Further adjustment of the position of gripper assembly 10 relative to swing plates 24 is provided by pivot pin 46. Lower arm 42 may pivot about this pin, and bolt 48 may be inserted through any one of a plurality of holes 49 in the lower portion of swing plates 24.

Figure 3:
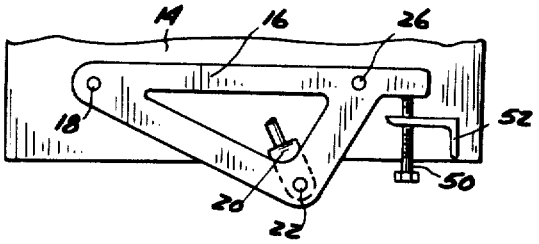
FIG. 3 is a fragmentary view of a portion of the linkage, illustrating the lift adjusting screw.

A lift adjustment screw 50 is threaded through a portion 52 of the frame and abuts a boss on link 16 (see FIG. 3). For a given setting of the position of gripper assembly 10 relative to swing plates 24, screw 50 controls the limit of travel of the gripper assembly into the press (that is, to the right as viewed in FIG. 1). Similar control of the travel of the gripper could alternatively be achieved by an adjustable stop (not illustrated) at the lower end of the guide slot between gibs 30. Other effects of variations in the lift adjustment screw will be discussed hereinafter.

Figure 4:
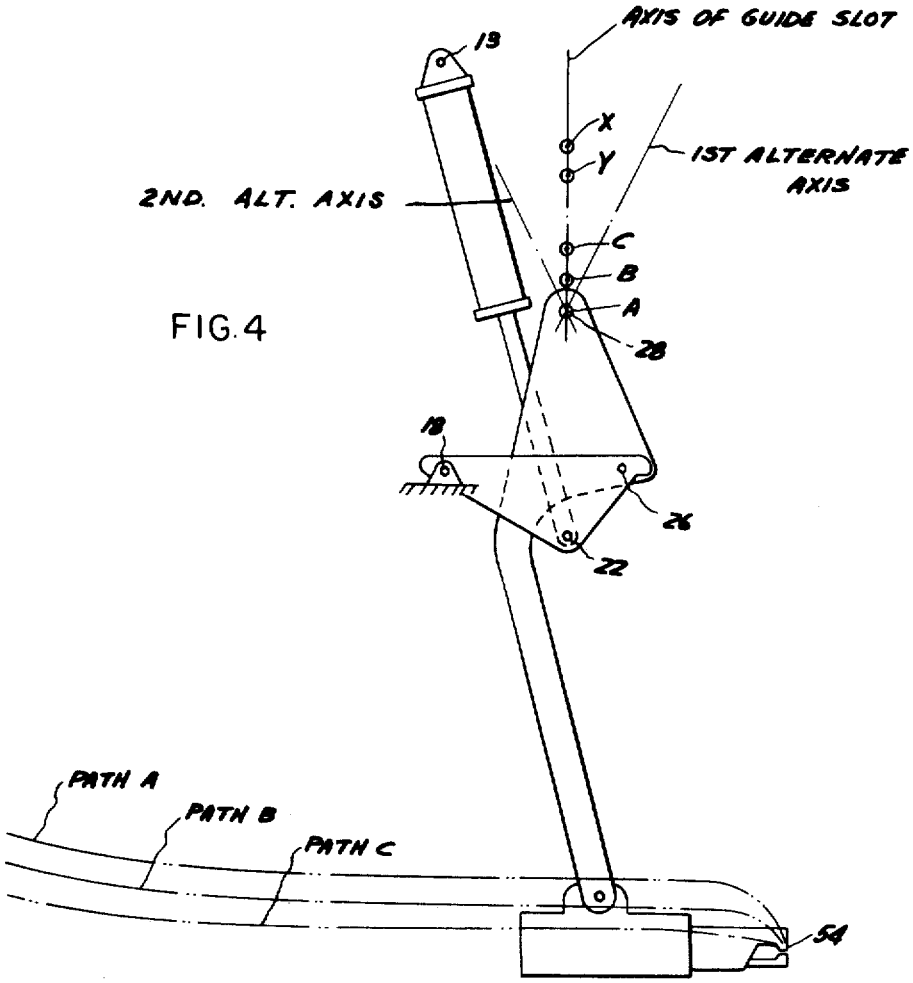
FIG. 4 is a simplified diagram of the mechanism of this invention showing the variety of work-handling arm strokes which may be obtained.

FIG. 4 illustrates the variation in the path of the gripper from the pick-up point 54 which may be obtained by adjustments in the setting of lift screw 50. With the screw in a relatively withdrawn position, so that follower 28 is initially at position A in FIG. 4, the path of pick-up point 54 is as illustrated at A at the bottom of the figure.

It can be seen that path A is characterized by a substantially vertical displacement at the beginning of the stroke, following which the stroke becomes flat and substantially horizontal. With successively higher positions of screw 50, producing initial points B and C of follower 28, the lift of pick-up point 54 becomes less at its origin, as indicated by paths B and C respectively. It is to be understood that the relative proportions of the mechanism as illustrated in FIG. 4 would not necessarily produce the extraction paths indicated. The illustrated extraction paths, rather than the mechanism dimensions, are intended to be illustrative of the desired characteristics of the device.

The shape of the extraction path can also be modified by adjustments in gibs 30. As discussed above, provision is made for mounting gibs 30 to frame members 14 in other parallel, non-vertical orientations. If they are inclined so as to produce the "first" guide slot axis (as illustrated and denoted in FIG. 4), the initial lift from the pick-up point will be increased, the length of the extraction stroke will be reduced, and the path will be inclined upwardly and to the left toward the end of the stroke. If the guide slot is inclined as in the "second" position of FIG. 4, the initial lift from the pick-up point will be increased, the length of the extraction stroke will be reduced, and the path will be substantially horizontal, with very little upward arc near its termination.

In any of these settings, the extraction path retains its essentially flat path toward the end of the stroke. This is because as link 16 rotates counterclockwise about point 18 (see FIG. 4), point 26 will fall on a line connecting points 18 and 28. At that position, point 28 will reach its uppermost point, point X in FIG. 4. Further rotation of link 16 will cause point 28 to return slightly to point Y, which prevents the gripper assembly 10 from assuming an upward arc near the end of the stroke.

OPERATION

The mechanism is first set so that the gripper jaws will reach and grip the piece to be extracted from the press. This is accomplished by appropriate setting of bolt 48, clamp 44, and adjustments (not illustrated) on gripper assembly 10. The desired lift and extraction path is then established by appropriate setting of lift screw 50 and gibs 30.

Upon an electrical signal from the press indicating that the part is ready for extraction, a valve on gripper assembly 10 extends the gripper and closes the jaws on the part. Cylinder 12 is then actuated, initiating the extraction stroke.

As discussed above, snubber 34 provides resistance only on the downward stroke. This means that no power is consumed by the snubber during the initial and intermediate portion of the extraction stroke, since the snubber piston is travelling upward as follower 28 moves to point X. At the terminal portion of the extraction stroke, and during the final portion of the return stroke, cushioning of the linkage is provided, since the snubber piston is then travelling downward. Maximum snubbing is provided at the end of the return stroke, since point 26 and point 28 are then moving at maximum velocity along a purely vertical path.

This invention may be further developed within the scope of the following claims. It is to be understood that the above description is illustrative of only a single embodiment and is not to be read in a strictly limited sense.

I now claim:

1. A work handling device comprising a frame; a first link pivoted on said frame for rocking movements in a vertical plane about a first axis; *linear fluid cylinder-piston* actuating means *axially spaced portions of which cylinder-piston are pivotally connected to said frame and pivotally* connected to said first link for rocking the latter about said axis; vertically extending guide means on said frame; a second link; means pivoting said second link to said first link for vertical movement and for simultaneous rocking movements with said first link but in an opposite direction in response to rocking of said first link by said actuating means; follower means on said second link near the upper end thereof, above said means pivoting said second link to said first link, in guiding relation with said guide means for guiding said second link vertically, said follower means forming a second axis about which said second link may rock in a vertical plane; *said cylinder-piston pivotal connections being located on a line which intersects a line joining said first and second axes* and work gripping means carried by said second link for movements with the latter, the pivotal connections of said links to one another and the pivotal connection of said actuating means to said first link being such that said simultaneous rocking of said links effects movement of said work gripping means along a path having an initial substantially vertical component and a secondary substantially horizontal component.

2. The combination defined in claim 1 in which said guide means comprises a slot and stop means is mounted in said slot for varying the movement of the follower means.

3. The device set forth in claim 1 including *separate* fluid means acting on said second link for cushioning said work gripping means at the ends of said path.

*4. The device set forth in claim 1 wherein said follower means passes a maximum vertical position and descends as said work gripping means approaches the end of said substantially horizontal component.*

*5. The device as set forth in claim 1 wherein said means pivoting said second link to said first link crosses a line connecting said first axis and said follower means as said work gripping means approaches the end of said substantially horizontal component.*

*6. The device set forth in claim 1 including cushioning means effective upon downward movement of said follower means to decelerate said work gripping means at the end of said substantially horizontal component and permit unrestricted motion at the initiation of return on said path, and to decelerate said work gripping means at the substantially vertical end of said return.*

*7. A work handling device as set forth in claim 1 wherein an adjustable mounting is provided for said guide means to accommodate adjustment in the effective path to meet specific initial vertical motion requirements.*

*8. The device as set forth in claim 6 wherein said cushioning means provides cushioning increasing to a maximum at the end of said return stroke.*

*9. The device as set forth in claim 8 wherein said cushioning harmonically increases to said maximum.*

*10. The device as set forth in claim 6 wherein said cushioning means comprises a fluid pressure cylinder assembly mounted on the frame in a generally vertical position with the rod end thereof uppermost and attached to the follower means.*

References Cited

The following references, cited by the Examiner, are of record in the patented file of this patent or the original patent.

UNITED STATES PATENTS

| | | | |
|---|---|---|---|
| 3,243,980 | 4/1966 | Sehn | 72—24 |
| 3,080,840 | 3/1963 | Deman | 214—147 T X |
| 3,358,851 | 12/1967 | Ashton | 214—147 T X |
| 3,209,922 | 10/1965 | Melvin | 214—1 |
| 2,609,776 | 9/1952 | Sahlin | 72—426 |
| 3,040,685 | 6/1962 | Ridley | 72—24 |

ROBERT G. SHERIDAN, Primary Examiner

G. F. ABRAHAM, Assistant Examiner

U.S. Cl. X.R.

214—147 T